(12) United States Patent
Badgley et al.

(10) Patent No.: US 9,073,267 B1
(45) Date of Patent: Jul. 7, 2015

(54) METHOD OF ASSEMBLING PANELS AND ADHESIVELY BONDED JOINTS USED THEREIN

(75) Inventors: Michael J. Badgley, Bothell, WA (US); Aaron G. Coon, Marysville, WA (US)

(73) Assignee: THE BOEING COMPANY, Chicago, IL (US)

(*) Notice: Subject to any disclaimer, the term of this patent is extended or adjusted under 35 U.S.C. 154(b) by 1293 days.

(21) Appl. No.: 12/720,729

(22) Filed: Mar. 10, 2010

(51) Int. Cl.
*B29C 65/54* (2006.01)
*B29C 65/56* (2006.01)
*B29C 65/00* (2006.01)

(52) U.S. Cl.
CPC ............ *B29C 65/542* (2013.01); *B29C 66/116* (2013.01); *B29C 66/124* (2013.01)

(58) Field of Classification Search
CPC ............ B29B 66/124–66/1248; B29B 66/126; B29B 66/116; B29C 65/542
USPC ...................... 156/91, 293, 305; 264/261, 263
See application file for complete search history.

(56) References Cited

U.S. PATENT DOCUMENTS

| 5,022,685 | A | * | 6/1991 | Stiskin et al. .................. 285/45 |
| 5,273,606 | A | | 12/1993 | Greve et al. |
| 5,670,109 | A | * | 9/1997 | DeRees ......................... 264/261 |
| 5,830,308 | A | | 11/1998 | Reichard |
| 6,558,503 | B1 | | 5/2003 | Healey |
| 6,582,539 | B2 | * | 6/2003 | Iwanczyk et al. ............ 156/73.5 |

\* cited by examiner

*Primary Examiner* — Scott W Dodds
(74) *Attorney, Agent, or Firm* — Yee & Associates, P.C.

(57) ABSTRACT

Panels are assembled using tab and slot joints. The panels are bonded together at the joints by injecting an adhesive through passageways in one of the panels into internal cavities formed between the tabs and the slots.

13 Claims, 5 Drawing Sheets

METHOD OF ASSEMBLING PANELS AND ADHESIVELY BONDED JOINTS USED THEREIN

TECHNICAL FIELD

The disclosure generally relates to methods for assembling and joining parts, and deals more particularly with a method of adhesively bonding panels together using mortise and tenon joints that are injected with an adhesive after the panels have been assembled.

BACKGROUND

Mortise and tenon joints are often used along with adhesive to join two or more parts together. For example, in the airline industry, adhesively bonded mortise and tenon joints may be used to join structural panels in order to construct closets, galleys, lavatories, storage compartments and other interior monuments in passenger cabins. In the past, the panels were dry fitted together and then disassembled. An adhesive was then applied to the parts forming the joints, following which the panels were reassembled. This assembly approach was relatively labor intensive since it was sometimes necessary to dry fit the panels more than once before the adhesive could be applied. The assembly process was made more difficult in those applications where a relatively fast drying adhesive was used which limited the "working time" during which the panels could be aligned and fitted together. Furthermore, some assemblies may be too large to allow both applying the adhesive and assembling the panels within the working life of the adhesive, thus requiring inserts, brackets or other mechanical hardware to join the panels. The hardware added undesirable weight, part count and cost to the assembled panel structure, and increased the time and labor required for assembly.

Accordingly, there is a need for a method of assembling panels and similar parts using bonded joints which may reduce or eliminate the need for repetitive dry fitting of the panels. There is also a need for a method of assembling large panel assemblies using bonded joints that may reduce or eliminate the need for mechanical hardware to reinforce the joint.

SUMMARY

The disclosed embodiments provide a method of assembling parts such as composite sandwich panels using mortise and tenon joints that may reduce assembly time. The method allows injection of a bonding adhesive directly into the mortise and tenon joint after the parts have been assembled, thus allowing the use of adhesives having relatively short working times and which may cure more quickly.

The disclosed embodiments utilize injection and vent openings in the parts to facilitate injection and flow of an adhesive into the joint. This allows the adhesive to be applied after, rather than before the joint is assembled, thus permitting the use of mortise and tenon joints in large assemblies that may not have been possible in the past due to limitations on the adhesive working time.

According to one disclosed embodiment, an adhesively bonded joint is provided between first and second parts. The joint comprises a slot defined by walls within the first part and a tab on the second part that is adapted to be inserted into the slot in the first part. The tab has sides spaced from the walls to form a cavity within the slot between the tab and the slot. A first passageway in one of the parts allows an adhesive to be injected into the cavity for bonding the first part to the second part. A second passageway in one of the parts allows air displaced by the injected adhesive to escape from the joint.

According to another disclosed embodiment, a panel assembly comprises first and second panels. The first panel has first and second opposite faces and at least one slot extending into the first face thereof. The second panel has at least one tab along an edge thereof which is adapted to be inserted into the slot. A cavity is provided between the tab and the slot, and a first passageway in the first panel allows adhesive to be injected into the cavity for adhesively bonding the panels together. The first passageway includes an opening in the second face of the first panel into which the adhesive may be injected. The panel assembly may further comprise a second passageway in the first panel for allowing air displaced by the adhesive to escape from the cavity.

According to another embodiment, a method is provided of joining first and second parts together. The method comprises the steps of forming at least one slot in the first part, forming at least one tab in the second part, and assembling the parts by inserting the tab into the slot. The method further comprises injecting an adhesive through a first passageway in one of the parts into a cavity between the tab and the slot. Forming the slot may include forming the slot partially through the thickness of the first part, and forming the tab may include forming the tab with dimensions smaller than those in the slot so as to form the cavity. Injecting the adhesive may be performed by introducing the adhesive through an opening in the face of the first part. A method may further comprise forming a second passageway in the first part for allowing air displaced by the adhesive to escape from the cavity.

According to still another embodiment, a method is provided of joining first and second panels together. The method comprises the steps of forming at least one slot in a first face of the first panel, and forming at least one tab along an edge of the first panel with dimensions smaller than those of the slot so as to form a cavity between the tab and the slot when the tab is inserted into the slot. The method further comprises forming a first passageway in the first panel extending between the first face of the first panel and the cavity, and assembling the first and second panels, including inserting the tab into the slot. The method also includes injecting an adhesive into the cavity through a first passageway, and forming a second passageway in the first panel extending between the first face of the first panel in the cavity for allowing the escape of air in the cavity displaced by the adhesive injected into the cavity.

Other features, benefits and advantages of the disclosed embodiments will become apparent from the following description of embodiments, when viewed in accordance with the attached drawings and appended claims

BRIEF DESCRIPTION OF THE ILLUSTRATIONS

DETAILED DESCRIPTION

Figure 1:
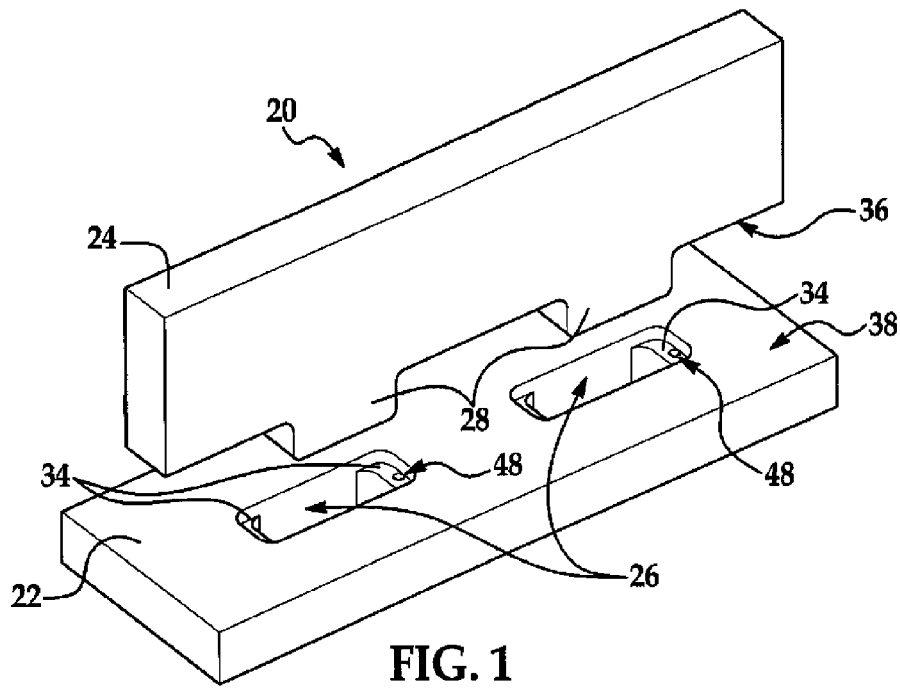
FIG. 1 is an illustration of a perspective view of two panels about to be assembled and joined according to a disclosed method embodiment.
Figure 2:
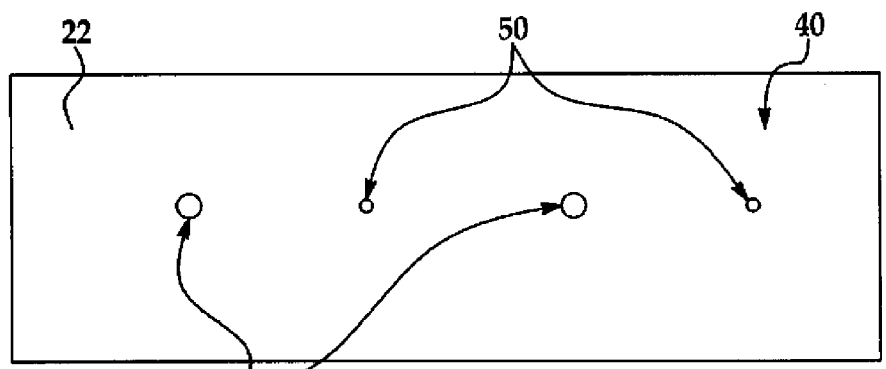
FIG. 2 is an illustration of the bottom of one of the panels shown in FIG. 1.

Referring first to FIGS. 1 and 2, the disclosed embodiments relate to a method of joining two or more parts 22, 24 to form a assembly 20. In the illustrated embodiment, parts 22, 24 are shown as flat panels such as composite sandwich panels used in the aircraft industry to produce lightweight, high strength assemblies or modules 20. However, the parts 22, 24 may be formed from other materials and may have other geometries, including one or more curvatures. For convenience of description, the parts 22, 24 will be referred to hereinafter as panels 22, 24. As will be described below, the panels 22, 24 are joined together by adhesively bonded mortise and tenon joints (not shown in FIGS. 1 and 2) formed by one or more mortises 26 formed in part 22, and one or more corresponding tenons 28 formed in part 24. For ease of description, the tenons 28 will sometimes be referred to herein as tabs 28, and the mortises 26 will sometimes be referred to as slots 26. Similarly, panel 22 may also sometimes be referred herein to as the slotted panel 22, while panel 24 may be referred to as the tabbed panel 24. In the illustrated example, the slots 26 and tabs 28 are each generally rectangular in shape, however other shapes are possible.

Figure 3:
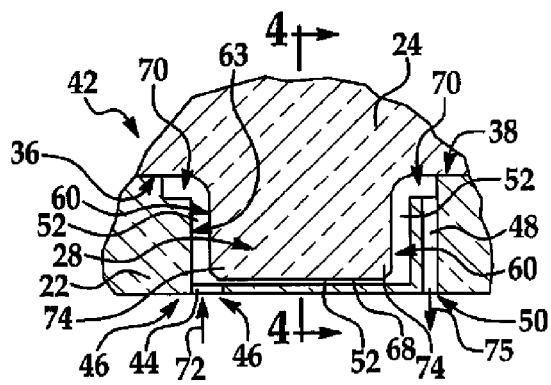
FIG. 3 is an illustration of a cross sectional view of one of the mortise and tenon joints used to join the panels shown in FIG. 1.
Figure 4:
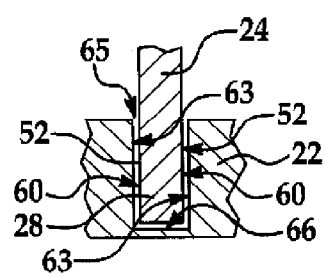
FIG. 4 is an illustration of a sectional view taken along the line 4-4 in FIG. 3.
Figure 5:
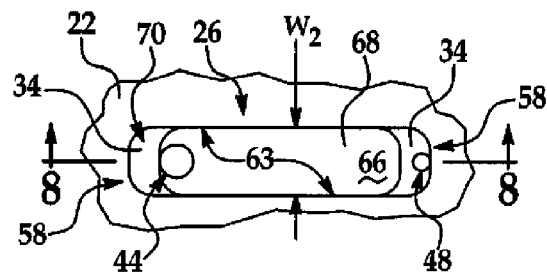
FIG. 5 is an illustration of a plan view of the slot forming part of the joint shown in FIG. 3.
Figure 6:
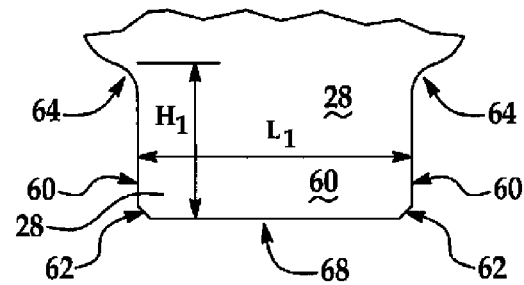
FIG. 6 is an illustration of a side view of the tab forming part of the joint shown in FIG. 3.
Figure 7:
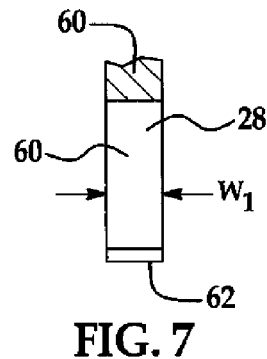
FIG. 7 is an illustration of an end view of the tab shown in FIG. 6.
Figure 8:
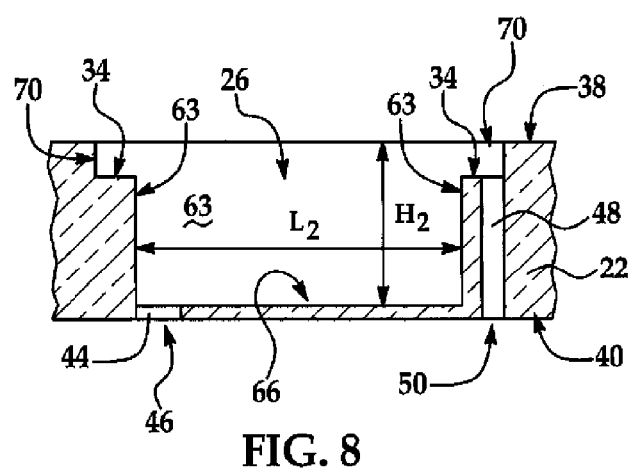
FIG. 8 is an illustration of a sectional view taken along the line 8-8 in FIG. 5.

Referring now particularly to FIGS. 3-8, when the panels 22, 24 are assembled, the bottom edge 36 of the tabbed panel 24 (FIG. 3) rests against the top surface 38 of slotted panel 22, and the tabs 28 extend into the slots to form mortise and tenon joints 42. Tab 28 has a length $L_1$, a height $H_1$ and a width $W_1$ that are respectively less than the length $L_2$, height $H_2$ and width $W_2$ of the slot 26 (see FIGS. 5-8). Due to this dimensioning of the tab 28 and the slot 26, the sides 60 of the tab 28 are spaced from the walls 63 of the slot 26, and the bottom 68 of the tab is spaced from the bottom wall 66 of the slot 26, thereby forming a cavity 52 between the tab 28 and the slot 26, that surrounds and envelops the tab 28, as best seen in FIG. 3. In the illustrated embodiment, the outer corners 74 of the tab 28 may be optionally beveled at 62 and the inside corners 64 may be optionally radiused, however, neither of these features may be necessary in other embodiments. Slot 26 includes a step 70 at the opposite ends thereof which forms a laterally extending shoulder 34. The shoulders 34 provide an area where air and excess adhesive may be redirected from the cavity 52 into the vent passageway 48. The steps 70 effectively form outward extensions of the cavity 52 and function to redirect and promote uniform flow of the adhesive completely throughout the assembled joint 42. The design of the cavity 52 and its configuration may optimize the flow and coverage of the adhesive within the joint 42.

The slotted panel 22 includes a first passageway therein 44 (FIG. 3) which extends from an injection opening (FIG. 2) in the bottom of the slotted panel 22 into one end of the cavity 52. The slotted panel 22 further includes a second passageway 48 therein which extends from a vent opening 50 (FIG. 2) in the bottom of the panel 22 to an opening 48 formed in the shoulder 34 at the other end of the cavity 52. Thus, passageways 44, 48 are essentially located at opposite ends of the cavity 52. The first passageway 44 has a diameter that may allow an adhesive (not shown) to be injected at a suitable rate into the cavity 52, while the second passageway 48 may have a diameter that is sufficient to allow air to vent or escape from the cavity 52 which is displaced by the adhesive being injected into the cavity 52. The step 70 allows the vent opening 50 to be located at one end of the cavity 52 so that air does not become trapped within any recesses of the cavity 52 that could potentially impede the flow of adhesive into these recesses.

Referring now concurrently to FIGS. 1-8, the panels 22, 24 are assembled by aligning and then inserting the tabs 28 into the slots 26, and bringing the panels 22, 24 together until the bottom edge 36 of the tabbed panel 24 seats firmly against the top surface 38 of the slotted panel 22. The beveled edge 62 of the tabs 28 may assist in guiding the tabs 28 into the slots 26 during the assembly process and may prevent injury to assembly workers from corners on the tabs 28 that may otherwise be sharp. With the panels 22, 24 having been assembled, a suitable adhesive (not shown) may be injected under pressure into each of the injection openings 46 using a nozzle (not shown) or other suitable means. The injected adhesive flows through the passageway 44 into the cavity 52. The beveled outer corners 62 and the radiused inner corners 64 on the tabs 28 may assist in encouraging the adhesive to flow smoothly along within and fill the cavity 52. Air within the cavity 52 displaced by the injected adhesive is allowed to escape from the cavity 52 via the passageway 48 and vent opening 50. Additionally, the size and location of the passageway 49 and opening 50 are chosen such that positive pressure is induced within the cavity, thus ensuring sufficient adhesive flow and coverage throughout the joint 42. It should be noted here that in some embodiments, it may be possible to inject the adhesive through opening 50, and vent through opening 46, providing that the step 70 is wide enough to accommodate a larger diameter of the passageway 48 that would be needed to allow injection of the adhesive, rather than venting of air, through the passageway 48. It may also be possible or desirable in some applications to inject the adhesive into openings 46 and apply a vacuum to the vent opening 50 in order to encourage the flow of adhesive through the cavity 52 until it is squeezed through the vent openings 50.

Thus, it may be appreciated that the injection openings 46, cavity 52 and vent openings 50 form a injection flow path that is integrated into the slotted panel 22. Injection of the adhesive through the injection opening 46 is continued until some small amount of the adhesive flows out from the vent opening 50, providing a visual verification that the cavity 52 has been substantially completely filled with the adhesive. Locating both the injection openings 46 and the vent openings 50 on one side 40 of the slotted panel 22 allows quick adhesive injection and immediate verification from a single point of view that the joint 42 has been filled.

Figure 9:
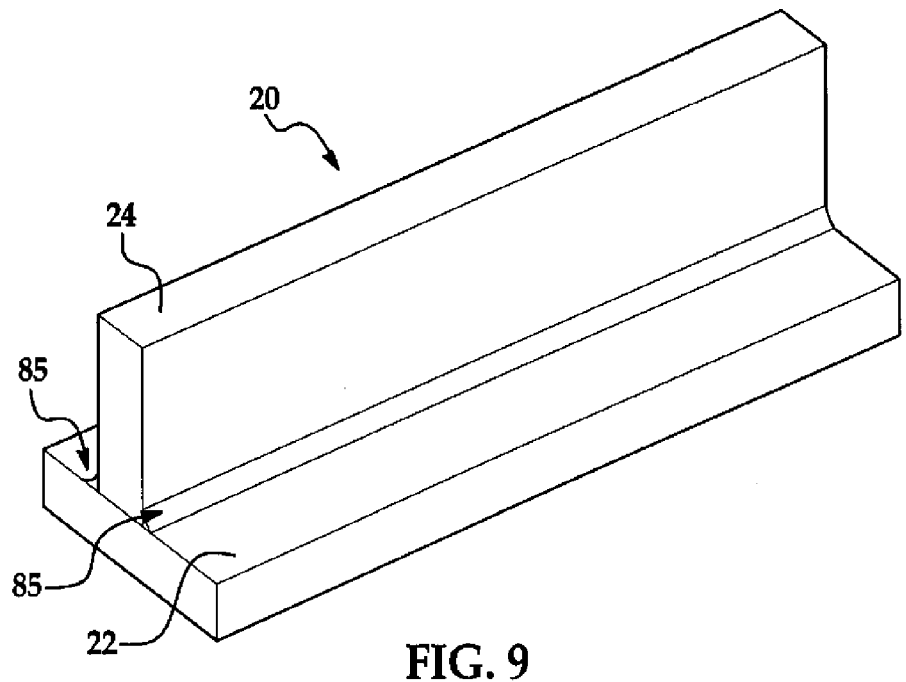
FIG. 9 is an illustration of a perspective view similar to FIG. 1, but showing panels having been assembled and the fillet seals having been applied.

When the adhesive is injected into the joint 42 under pressure, it may be necessary or desirable to prevent excess adhesive from flowing out around the periphery of the joint 42 between the panels 22, 24, rather than flowing completely through and filling the cavity 52. One technique for addressing this issue is illustrated in FIG. 9. After the panels 22, 24 have been assembled but before the adhesive is injected into the cavity 52, fillet seals 85 may be applied along intersecting edges of the slotted panel 22 and the tabbed panel 24 in order to form a dam that prevents the escape of adhesive from the joint 42 until the adhesive cures. The fillet seals 85 may comprise any suitable and compatible flowable sealant material that forms a dam which prevents outflow of the injected adhesive from the intersection of the panels 22, 24. For example, and without limitation, a one or two component flowable sealant applied by a gun or syringe type dispenser or may be used to form the fillet seals 85 which is curable to a substantially rigid or semi-rigid state. It may be possible to form the fillet seals 85 using other materials and techniques. In addition to preventing the outflow of the injected adhesive, the fillet seals 85 also provide a visually smooth transition between the panels 22, 24 and seal the intersections between the panels 22, 24 against later intrusion by fluids, dirt, etc. Following curing of the fillet seals 85, the adhesive may be injected into the cavity 52 as previously described.

Figure 10:
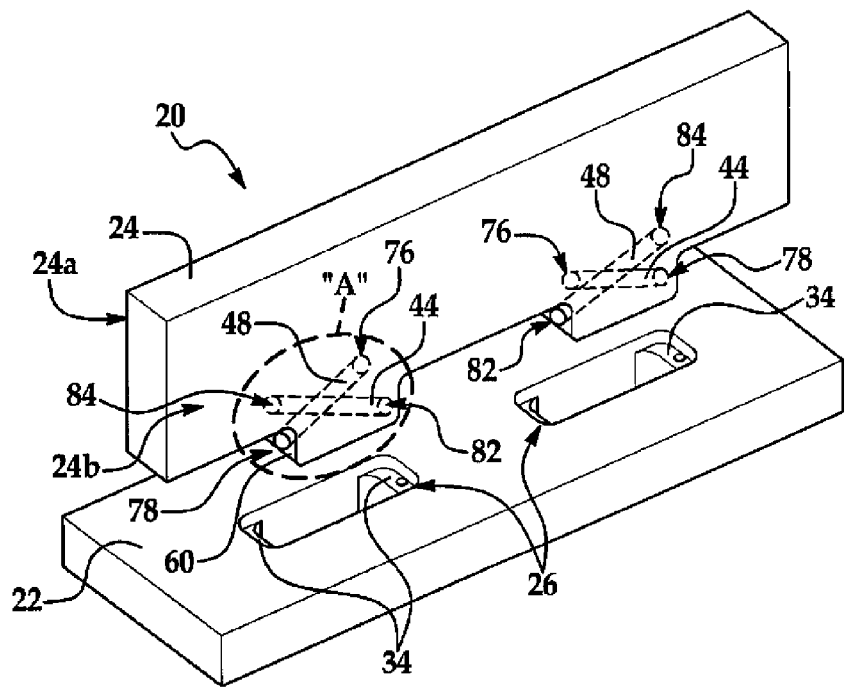
FIG. 10 is an illustration of a perspective view of two panels just prior to being preassembled, which employ an alternate form of the joint.
Figure 11:
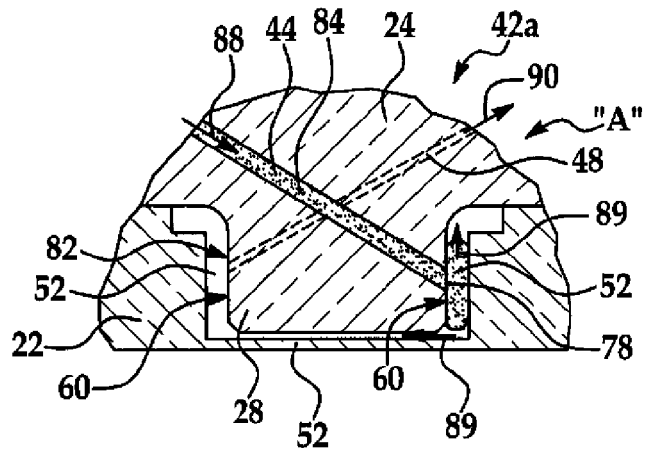
FIG. 11 is an illustration of a cross sectional view of one of the joints used in the embodiment shown in FIG. 10.

FIGS. 10 and 11 illustrate another embodiment of a joint 42a (FIG. 11) in which the adhesive, shown at 84, may be injected into the cavity 52 through injection openings 76 in one face 24a of the tabbed panel 24. The injection openings 76 are connected by passageways 48 to outlet openings 78 in one side 60 of the tabbed panel 24. Air within the cavity 52 is permitted to escape through vent openings 84 formed in the opposite face 24b of the tabbed panel 24. Each of the vent openings 84 is connected with the cavity 52 by an inlet opening 82 in the other side 60 of the tab 28 and a passageway 48. FIG. 11 illustrates adhesive 84 being injected through the passageway 44 and flowing at 89 into the cavity 52 while air is allowed to escape at 90.

It may be possible to use other techniques for filling the joint cavity 52 with adhesive that do not rely on injection and vent openings in the slotted panel 22. For example, it may be possible to inject adhesive into the cavity 52 by placing an injection nozzle (not shown) into the gap 65 (see FIG. 4) that is present between the sides 60 of the tab 28 and the sides 63 of the slot 26. This method may require that injection and vent openings (not shown) be formed in the one of the fillet seals 85 that covers the intersection of the panels 22, 24. These openings in the fillet seal 85, which would preferably be located at opposite ends of the tab 28, could be filled with additional sealant after the adhesive is cured.

Figure 12:
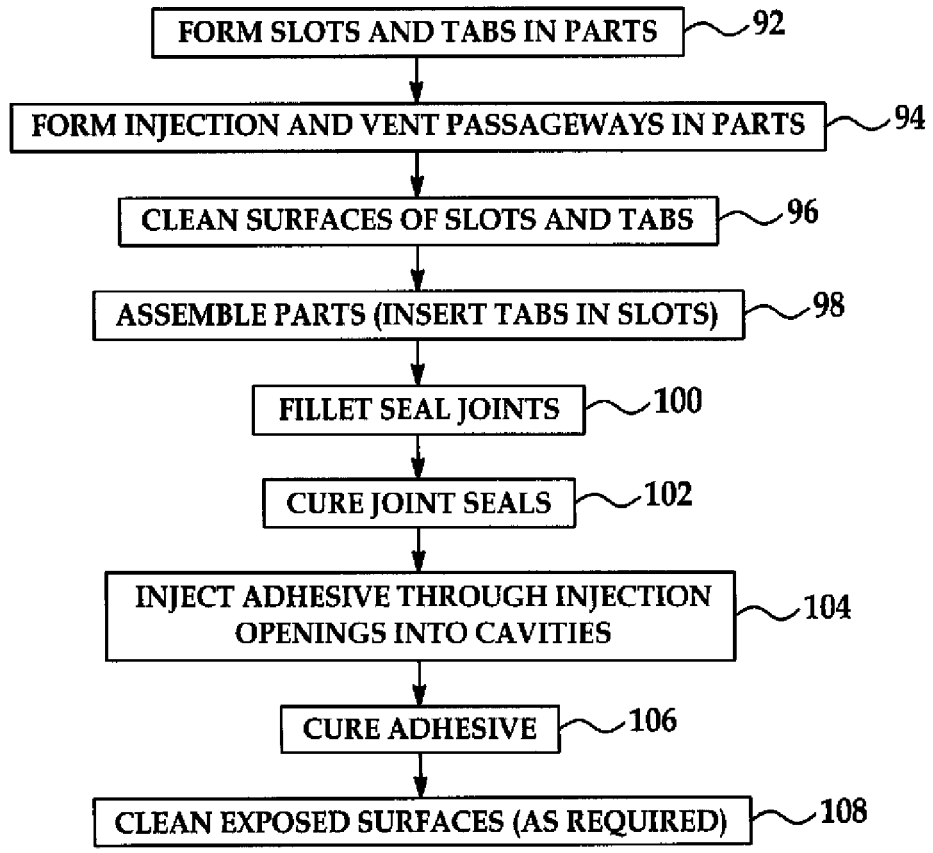
FIG. 12 is an illustration of a flow diagram showing the steps of the method of assembling parts using adhesively bonded joints according to one of the embodiments.

Attention is now directed to FIG. 12 which illustrates a method of assembling parts 22, 24 using the adhesively bonded joints 42 described above. Beginning at 92, the slots 26 and tabs 28 are respectively formed in the parts 22, 24. The slots 26 and tabs 28 may be formed by any of various manufacturing processes, including, without limitation, milling, drilling and molding. Then, at 94, the injection and vent passageways 44, 48 respectively are formed in the parts 22, 24 as by molding or drilling, which in some applications, may form part of step 92 in which the slots 26 and tabs 28 are formed. At 96, mating surfaces of the slots 26 and tabs 28 are cleaned as by wiping them with rags and a suitable solvent, following which, at step 98, the parts 22, 24 are assembled by inserting the tabs 28 into the slots 26.

Next, at step 100, fillet seals 85 are applied to the intersecting areas between the parts 22, 24 around the joints 42, following which the fillet seals 85 are cured at step 102. Next, as shown at 104, a suitable adhesive is injected through the injection openings 46, 84 into cavities 52 until adhesive is observed to squeeze out of the vent openings 50, 76, signaling that the cavities 52 have been completely filled with adhesive. Tape (not shown) may be applied to panel 22 covering the openings 46, 50, and at 106, the adhesive is cured, following which, at 108, the tape may be removed and the exposed surfaces of the parts 22, 24 may be cleaned by wiping them with rags and a suitable solvent, as required.

Figure 13:
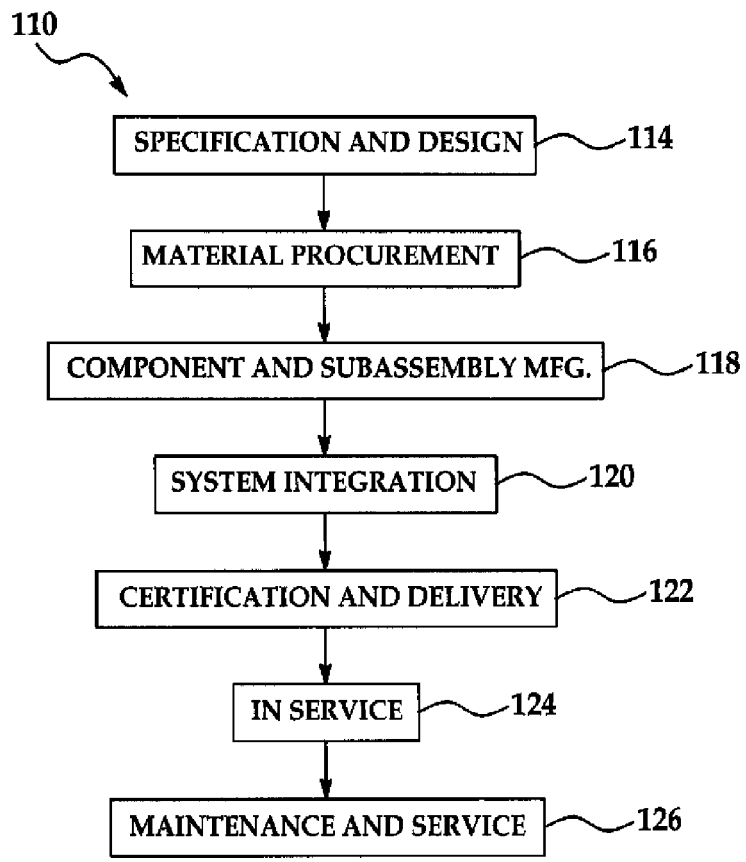
FIG. 13 is a flow diagram of aircraft production and service methodology.
Figure 14:
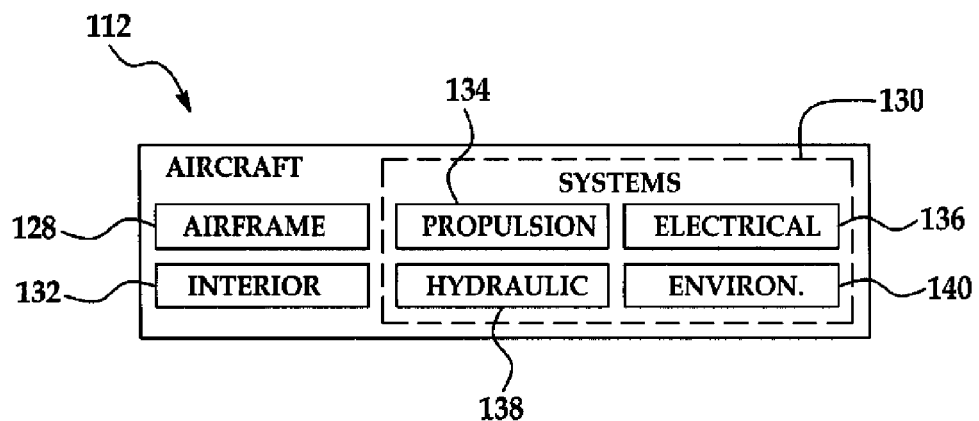
FIG. 14 is a block diagram of an aircraft.

Embodiments of the disclosure may find use in a variety of potential applications, particularly in the transportation industry, including for example, aerospace, marine and automotive applications. Thus, referring now to FIGS. 12 and 13, embodiments of the disclosure may be used in the context of an aircraft manufacturing and service method 110 as shown in FIG. 12 and an aircraft 112 as shown in FIG. 13. Aircraft applications of the disclosed embodiments may include, for example, a wide variety of assemblies and subassemblies such as, without limitation, lavatories, crew rest facilities, cabin partitions, galleys, closets, and storage bins to name only a few. During pre-production, exemplary method 110 may include specification and design 114 of the aircraft 112 and material procurement 116. During production, component and subassembly manufacturing 118 and system integration 120 of the aircraft 112 takes place. Thereafter, the aircraft 112 may go through certification and delivery 122 in order to be placed in service 124. While in service by a customer, the aircraft 112 is scheduled for routine maintenance and service 126 (which may also include modification, reconfiguration, refurbishment, and so on).

Each of the processes of method 110 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 13, the aircraft 112 produced by exemplary method 110 may include an airframe 128 with a plurality of systems 130 and an interior 132. Examples of high-level systems 130 include one or more of a propulsion system 134, an electrical system 130, a hydraulic system 138, and an environmental system 140. Any number of other systems may be included. The disclosed method may be employed to fabricate assemblies or subassemblies used in the interior 132. Although an aircraft example is shown, the principles of the disclosure may be applied to assemble portions of a spacecraft, and to assemble components used in other industries, such as the marine and automotive industries.

Systems and methods embodied herein may be employed during any one or more of the stages of the production and service method 110. For example, assemblies or subassemblies corresponding to production process 118 may be fabricated or manufactured in a manner similar to components or subassemblies produced while the aircraft 112 is in service. Also, one or more apparatus embodiments, method embodiments, or a combination thereof may be utilized during the production stages 118 and 120, for example, by substantially expediting assembly of or reducing the cost of an aircraft 112. Similarly, one or more of apparatus embodiments, method embodiments, or a combination thereof may be utilized while the aircraft 112 is in service, for example and without limitation, to maintenance and service 126.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of joining first and second parts together, comprising:

forming at least one slot in the first part;
forming at least one tab in the second part;
assembling the parts by inserting the tab into the slot, the tab having dimensions smaller than the slot so as to define a cavity between the tab and the slot, the cavity extending along two sidewalls and a bottom wall of the slot and extending over a lateral shoulder defined in the slot;
injecting an adhesive through a first passageway in the first part into the cavity between the tab and the slot until the adhesive flows out from a second passageway, the first passageway extending from an outer face of the first part into to the cavity, the second passageway extending through the lateral shoulder into the cavity.

2. The method of claim 1, further comprising:
sealing the intersection of the first part with the second part to prevent the escape of injected adhesive at the intersection, and
wherein the adhesive is injected into the cavity after the parts have been assembled and the intersection has been sealed.

3. The method of claim 1, wherein the tab further has beveled corners.

4. The method of claim 1, wherein:
the first part is a panel having first and second opposite faces and the slot is located in the first face, and
the second part is a panel having an edge and the tab is located along the edge of the panel.

5. The method of claim 1, wherein the first and second passageways are connected with the cavity at locations that are spaced from each other.

6. The method of claim 1, wherein:
the tab has a length $L_1$,
the slot has a length $L_2$ that is greater than the length $L_1$,
the tab has a height $H_1$,
the slot has a height $H_2$ that is greater than the height $H_1$,
the tab has a width $W_1$, and
the slot has a width $W_2$ that is greater than the width $W_1$.

7. The method of claim 1, further comprising:
forming a seal between the first and second parts at an intersection between the tab and the slot, the seal configured to prevent the escape of adhesive injected into the cavity.

8. The method of claim 4, wherein the second passageway includes a vent opening in the second face of the first panel through which air escapes from the cavity.

9. A method of joining first and second panels together, comprising:
forming at least one slot in a first face of the first panel;
forming at least one tab along an edge of the second panel with dimensions smaller than the slot so as to form a cavity between the tab and the slot when the tab is inserted into the slot;
forming a first passageway in the first panel extending from an injection opening on a bottom of the first panel into the cavity;
assembling the first and second panels, including inserting the tab into the slot so as to form the cavity extending along two sidewalls and a bottom wall of the slot and extending over a lateral shoulder defined in the slot, a bottom edge of the second panel resting against a top surface of the first panel;
injecting an adhesive into the cavity through the injection opening into the first passageway; and
wherein the lateral shoulder further comprises a second passageway extending through the lateral shoulder into the cavity.

10. The method of claim 9, further comprising:
forming the second passageway in the first panel extending from a vent opening on the bottom of the first panel into the cavity and configured to allow the escape of air in the cavity displaced by the adhesive injected into the cavity; and injecting the adhesive into the first passageway until the adhesive exits through the second passageway.

11. The method of claim 9 wherein the lateral shoulder is a first lateral shoulder, wherein forming the slot includes forming the first lateral shoulder and a second lateral shoulder in the slot that are spaced from the edge of the second panel.

12. The method of claim 9, further comprising:
sealing the intersection between the first and second panels, and
wherein the adhesive is injected into the cavity after the panels have been assembled and the intersection has been sealed.

13. A method of fabricating a composite subassembly for an aircraft, comprising:
forming a first composite panel having first and second opposite faces, the first composite panel being substantially flat;
forming a plurality of slots in the first panel that extend from the first face partially through a thickness of the first panel but not through to the second opposite face, including forming lateral shoulders in the first panel within each of the slots;
forming a plurality of first passageways in the first panel which respectively extend from the second opposite face into a corresponding cavity;
forming a plurality of second passageways in the first panel which respectively extend from the second face through an associated one of the lateral shoulders into a corresponding cavity;
forming a second composite panel having an edge and a plurality of tabs along the edge, the plurality of tabs positioned so as to extend into the plurality of slots, the second panel further comprising radiused corners between each of the tabs and the edge, the second composite panel being substantially flat;
assembling the first and second panels including inserting the plurality of tabs on the second panel into the plurality of slots in the first panel, a bottom edge of the second panel resting against a top surface of the first panel, each of the plurality of tabs having dimensions smaller than a corresponding slot to define a cavity between the tab and the slot, the cavity extending along two of the sidewalls and a bottom wall of the slot and extending over the lateral shoulders, each of the tabs further having beveled corners;
injecting an adhesive into each of the plurality of first passageways so that the adhesive enters the cavities and allows air in the cavities to be displaced by the injected adhesive and to escape through the corresponding second passageways; and
adhesively bonding the first and second panels together.

* * * * *